BROWN & DERBY.
Meat Roaster.
No. 17,259.
2 Sheets—Sheet 2.
Patented May 12, 1857.
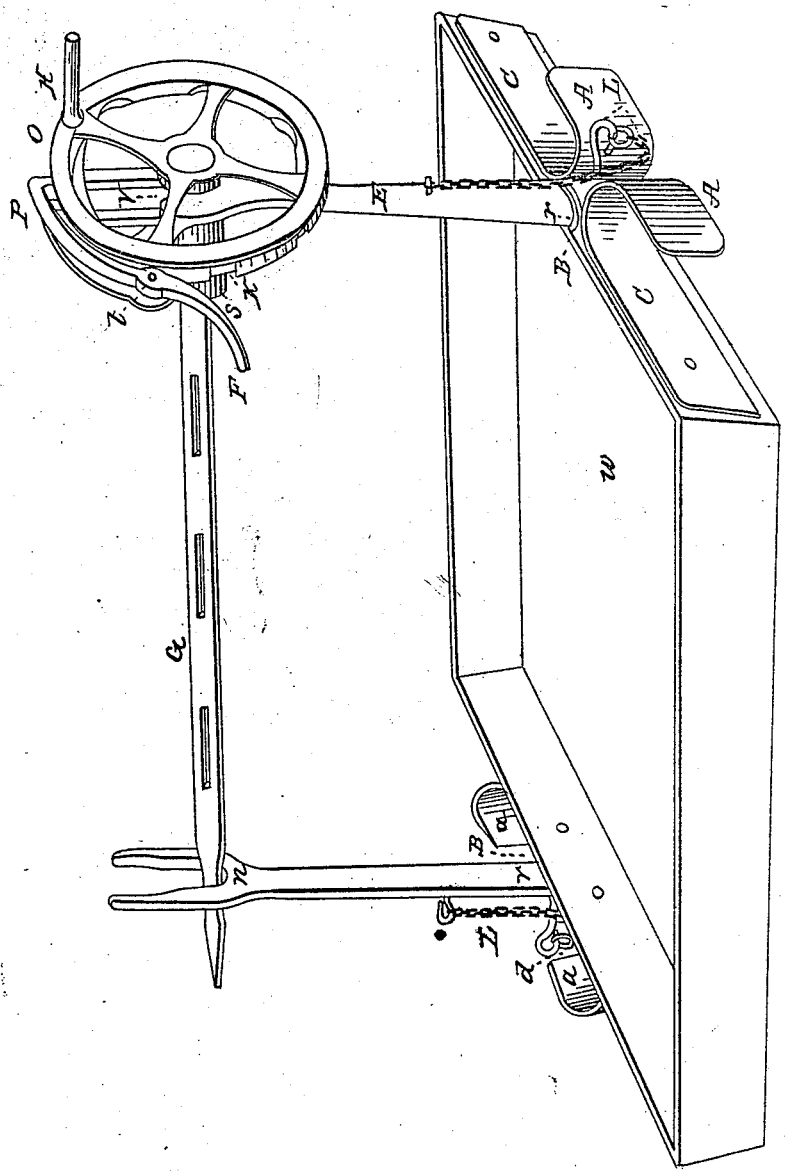

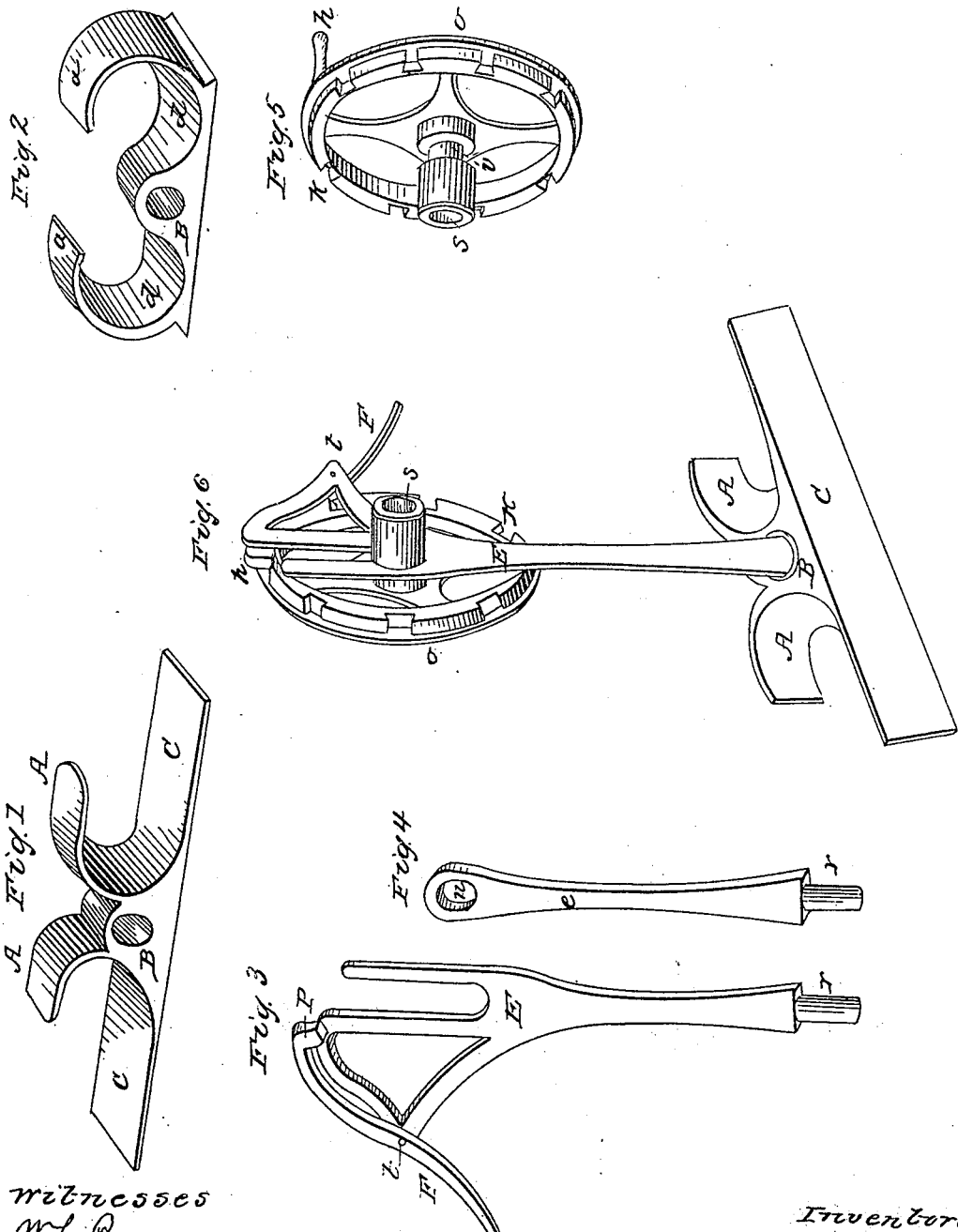
BROWN & DERBY.
Meat Roaster.
No. 17,259.
2 Sheets—Sheet 1.
Patented May 12, 1857.

UNITED STATES PATENT OFFICE.

JOHN G. BROWN AND JOHN P. DERBY, OF SOUTH READING, MASSACHUSETTS.

APPARATUS FOR ROASTING MEAT.

Specification of Letters Patent No. 17,259, dated May 12, 1857.

*To all whom it may concern:*

Be it known that we, JOHN G. BROWN and JOHN P. DERBY, of South Reading, county of Middlesex and State of Massachusetts, have invented a new and useful Improvement in Apparatus for Roasting Meat; and we do hereby declare that the same is fully described and represented in the following specification and the accompanying drawings, which represent the various parts of our device, showing a very simple and convenient mode of attaching a spit to any baking pan and affording an apparatus which can be conveniently and profitably employed for roasting meat or poultry in stove-ovens or in any other oven.

To enable others skilled in the art to make and use our improvement, we will now proceed to give a particular description, referring to the letters annexed to the drawings, which are intended to represent the various parts and portions of the device.

It will be seen that the handles A, a, when made of the proper shape to fit flaring ends of pan, W, may be securely riveted to the pan and become a permanent attachment, affording at all times convenient handles for lifting and moving it; the plates C, d, through which the rivets are put, serving at the same time to strengthen and support the ends of the pan. Connected with the handles, A, a, are some sockets which are represented by letters B, B, these sockets are intended to receive the ends r, r, of the two standards or rests E, e, and will allow said standards to stand in a true and perpendicular position; the sockets B, B, may be round, or square, or any other shape desired, the ends r, r, of standards being made to correspond.

The two standards E, e, being only intended to support the spit, G, when it is desired to use the pan W, for the purpose of roasting, can be removed, thus allowing the pan W, to be used for any other purpose required. Said standards may be secured in the sockets B, B, by having a thread cut on their respective ends, and a corresponding thread being cut in the sockets B, B, they may be firmly screwed to place, or they may be kept in the sockets by means of a spring, or springs attached either to the standards E, e, or to the handles A, a. The device represented by the drawing for this purpose consists of a pin L which is secured to the standards E, e, by means of a chain L, a hole being drilled through the sockets B, B, and the ends r, r, of standards, through which the pin L passes, thus securing the standards in place.

The use of pawl P (which is riveted to the arm of the standard E, as shown by letter b,) will be readily seen; a piece of iron of the proper size and length for the spit G, may be pointed at the end, and having the holes for the skewers punched at proper intervals, may be inserted into the socket S, and there secured either by a rivet or pin, or by means of a screw, or spring, as may be desired; said socket S being made of any desired shape to receive it; it is evident that the spit G being so attached and having the meat secured firmly by the use of skewers, can by the means of pawl P, be held in any required position, and to change the position it is only necessary to press down the handle F, which removes the pawl P, from the ratchet K, when by means of the handle H, which is attached to the rim of wheel O, the spit can be revolved to any required position.

It is intended that the journal or bearing V shall be made to fit into the slot of standard E, and the pointed ends of the spit G, may be also dropped into the slot, w, in standard e.

Heretofore there has been no device which enabled the spit to be used in any and all ovens. Our device furnishes a very cheap and convenient attachment for any baking pan, the handles A, a, standards E, e, and wheel O, may be made of cast or malleable iron, or any metal or composition; and being cast can be produced from suitable patterns so that they can be used with but little if any finish, and the spit G being so easily and cheaply made, the device can be constructed for about one-half of the cost of the spit as ordinarily made, thus allowing it to be sold at a price that will make it available for the use of any and all families; this taken into connection with the fact that meat by its use can be roasted with less expense in amount of fuel consumed, renders the improvement one of practical utility.

We are well aware that a wire, or iron frame, may be used to support a spit, which frame may be set into the pan W or into which the pan may be set, and we have so constructed and used them in connection with the spit G for the purpose of roasting meat in ovens, but we prefer the device before described, it being more conveniently made and also obviates some other objections that were suggested by the use of the frame.

We are also aware that standards or rests having proper slots for receiving the spit may be firmly riveted to the ends of the pan W, or the rests may be a part and continuation of the pan W, but there being an objection to that mode of attaching the rests, on account of its being liable to interfere with uses to which the pan may be put other than roasting meat, we have found it desirable to so construct the device that the pan can be used with, or without the standards, E, e, at pleasure.

We do not claim the use of a wheel with a socket attached, on or into which wheel, a band, or gears run for the purpose of turning the spit, a device of that kind having before been used in the application of clock machinery which is moved by a spring or weight. Neither do we claim the various parts of the devices named in our specification, as separated, and disconnected, from each other. But

What we claim and desire to secure by Letters Patent, is—

A new article of manufacture, consisting of a pan, with the handles A, a, sockets B, B, the removable standards E, e, ratchet, wheel, pawl and spit, for a roasting apparatus, all arranged and operating as described.

In testimony whereof we have hereunto set our signatures, this sixth day of April A. D. one thousand eight hundred and fifty-seven.

J. G. BROWN.
JOHN P. DERBY.

Witnesses:
W. L. BROWN,
BENJAMIN P. DERBY.